US009921903B2

(12) United States Patent
Neerincx et al.

(10) Patent No.: US 9,921,903 B2
(45) Date of Patent: *Mar. 20, 2018

(54) SMART ERROR RECOVERY FOR DATABASE APPLICATIONS

(71) Applicant: MICROSOFT TECHNOLOGY LICENSING, LLC, Redmond, WA (US)

(72) Inventors: Matthew A. Neerincx, Sammamish, WA (US); Luiz F. Santos, Lynnwood, WA (US); Oleg Ignat, Bellevue, WA (US); David B. Lomet, Redmond, WA (US); Quetzalcoatl Bradley, Monroe, WA (US); Raghu Ram, Redmond, WA (US); Chadwin J. Mumford, Woodinville, WA (US); Peter Gvozdjak, Bellevue, WA (US); Balendran Mugundan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 126 days.

This patent is subject to a terminal disclaimer.

(21) Appl. No.: 14/973,267

(22) Filed: Dec. 17, 2015

(65) Prior Publication Data

US 2016/0103731 A1 Apr. 14, 2016

Related U.S. Application Data

(63) Continuation of application No. 13/653,318, filed on Oct. 16, 2012, now Pat. No. 9,235,464.

(51) Int. Cl.
*G06F 11/07* (2006.01)
*H04L 29/14* (2006.01)

(52) U.S. Cl.
CPC ...... *G06F 11/0793* (2013.01); *G06F 11/0709* (2013.01); *H04L 69/40* (2013.01)

(58) Field of Classification Search
CPC . G06F 11/0709; G06F 11/079; G06F 11/0793
(Continued)

(56) References Cited

U.S. PATENT DOCUMENTS 5,566,297 A 10/1996 Devarakonda et al.
5,826,085 A 10/1998 Bennett et al.
(Continued)

FOREIGN PATENT DOCUMENTS

EP 0554854 A2 8/1993

OTHER PUBLICATIONS

"Oracle® Application Server Containers for J2EE Services Guide 10g Release 2 (10.1.2) for Windows or UNIX", Retrieved from <<http://docs.oracle.com/cd/B14099_19/web.1012/b14012/datasrc.htm>>, Retrieved on: Dec. 22, 2011, 23 Pages.
(Continued)

*Primary Examiner* — Joseph R Kudirka
(74) *Attorney, Agent, or Firm* — Fiala & Weaver P.L.L.C.

(57) ABSTRACT

A database server includes logic that is operable to monitor and analyze at least events occurring within an environment of the database server and/or execution errors generated by the database server in order to detect whether a problem condition exists. The database server further includes logic that is operable to send one or more commands to a database driver of a client that is communicatively connected to the database server, the one or more commands specifying one or more actions to be taken by the database driver in response to the existence of the problem condition. The database driver includes logic that is operable to receive the
(Continued)

one or more commands from the database server and logic that is operable to cause the one or more commands to be executed.

20 Claims, 6 Drawing Sheets

(58) Field of Classification Search
USPC .................................................. 714/4.1, 4.11
See application file for complete search history.

(56) References Cited

U.S. PATENT DOCUMENTS

| | | |
|---|---|---|
| 5,857,188 A | 1/1999 | Douglas |
| 5,951,694 A | 9/1999 | Choquier et al. |
| 5,960,436 A | 9/1999 | Chang et al. |
| 6,119,110 A | 9/2000 | Carapelli |
| 6,182,086 B1 | 1/2001 | Lomet et al. |
| 6,185,695 B1 | 2/2001 | Murphy et al. |
| 6,199,110 B1 | 3/2001 | Rizvi et al. |
| 6,314,455 B1 | 11/2001 | Cromer et al. |
| 6,381,617 B1 | 4/2002 | Frolund et al. |
| 6,453,354 B1 | 9/2002 | Jiang et al. |
| 6,463,459 B1 | 10/2002 | Orr et al. |
| 6,490,610 B1 | 12/2002 | Rizvi et al. |
| 6,539,494 B1 | 3/2003 | Abramson et al. |
| 6,704,778 B1 | 3/2004 | Horman |
| 6,778,653 B1 | 8/2004 | Kallas et al. |
| 6,801,914 B2 | 10/2004 | Barga et al. |
| 6,820,085 B2 | 11/2004 | Nishizawa et al. |
| 6,915,338 B1 | 7/2005 | Hunt et al. |
| 7,099,950 B2 | 8/2006 | Jones et al. |
| 7,188,111 B2 | 3/2007 | Chen et al. |
| 7,231,636 B1 | 6/2007 | Evans |
| 7,284,155 B2 | 10/2007 | Faihe et al. |
| 7,343,515 B1 | 3/2008 | Gilbertson et al. |
| 7,454,497 B1 | 11/2008 | Estabrooks |
| 7,657,782 B2 | 2/2010 | Das et al. |
| 7,664,879 B2 | 2/2010 | Chan et al. |
| 7,693,999 B2 | 4/2010 | Park |
| 7,702,947 B2 | 4/2010 | Peddada |
| 7,716,274 B1 | 5/2010 | Kumar |
| 7,765,256 B2 | 7/2010 | Doshi et al. |
| 7,788,521 B1 | 8/2010 | Sim-Tang |
| 7,853,926 B2 | 12/2010 | Blouin et al. |
| 7,882,173 B2 | 2/2011 | Hirsch et al. |
| 7,953,883 B2 | 5/2011 | Thomas et al. |
| 7,984,073 B1 | 7/2011 | Basiago et al. |
| 8,010,850 B2 | 8/2011 | Kruse et al. |
| 8,051,180 B2 | 11/2011 | Mazzaferri et al. |
| 8,103,779 B2 | 1/2012 | Belkin et al. |
| 8,522,086 B1 | 8/2013 | Garrett |
| 8,645,532 B2 | 2/2014 | Reynolds et al. |
| 8,700,945 B1 | 4/2014 | Allen et al. |
| 2002/0111949 A1 | 8/2002 | Barga et al. |
| 2002/0152430 A1 | 10/2002 | Akasaka et al. |
| 2003/0084165 A1 | 5/2003 | Kjellberg et al. |
| 2003/0145103 A1 | 7/2003 | Pruyne et al. |
| 2004/0044865 A1 | 3/2004 | Sicola et al. |
| 2004/0249948 A1 | 12/2004 | Sethi et al. |
| 2005/0240558 A1 | 10/2005 | Gil et al. |
| 2006/0075112 A1 | 4/2006 | Polozoff |
| 2006/0123098 A1 | 6/2006 | Asher et al. |
| 2006/0242286 A1 | 10/2006 | Hawkins et al. |
| 2007/0174493 A1 | 7/2007 | Irish et al. |
| 2007/0208862 A1 | 9/2007 | Fox et al. |
| 2008/0033964 A1 | 2/2008 | Richards et al. |
| 2008/0062863 A1 | 3/2008 | Ginde |
| 2008/0126831 A1 | 5/2008 | Downey et al. |
| 2008/0134138 A1 | 6/2008 | Chamieh et al. |
| 2008/0229023 A1 | 9/2008 | Plamondon |
| 2008/0301148 A1 | 12/2008 | Lee et al. |
| 2008/0301418 A1 | 12/2008 | Khailany et al. |
| 2009/0083088 A1 | 3/2009 | Mathew et al. |
| 2009/0113457 A1 | 4/2009 | Sedukhin et al. |
| 2009/0119536 A1 | 5/2009 | Guo et al. |
| 2010/0064130 A1 | 3/2010 | Borisov |
| 2010/0153702 A1 | 6/2010 | Loveless |
| 2010/0205583 A1 | 8/2010 | Gebhardt et al. |
| 2010/0257200 A1 | 10/2010 | Lee et al. |
| 2011/0055839 A1 | 3/2011 | Alexander et al. |
| 2011/0060622 A1 | 3/2011 | Piersol et al. |
| 2011/0113247 A1 | 5/2011 | Panasyuk et al. |
| 2011/0213821 A1 | 9/2011 | Gentile et al. |
| 2012/0197925 A1 | 8/2012 | Balagopalan et al. |
| 2012/0266211 A1 | 10/2012 | Mugundan et al. |
| 2013/0066949 A1 | 3/2013 | Colrain et al. |
| 2013/0311525 A1 | 11/2013 | Neerincx et al. |
| 2013/0339533 A1 | 12/2013 | Neerincx et al. |
| 2014/0032491 A1 | 1/2014 | Neerincx et al. |
| 2014/0032964 A1 | 1/2014 | Neerincx et al. |

OTHER PUBLICATIONS

"Non-Final Office Action Issued in U.S. Appl. No. 13/471,670", dated Dec. 18, 2013, 19 Pages.

"Non-Final Office Action Issued in U.S. Appl. No. 13/527,384", dated Jan. 17, 2014, 20 Pages.

Sultan, et al., "Recovering Internet Service Sessions from Operating System Failures", In Journal of IEEE Internet Computing, vol. 9, Issue 2, Mar. 2005, 10 Pages.

Wilbur, et al., "Building Distributed Systems with Remote Procedure Call", In Software Engineering Journal, vol. 2, Issue 5, Sep. 1987, pp. 148-159.

Roehm, et al., "WebSphere Application Server V6 Scalability and Performance Handbook", An IBM Redbooks Publication, May 26, 2005, 369 Pages.

"Non-Final Office Action Issued in U.S. Appl. No. 13/560,468", dated Nov. 8, 2013, 8 Pages.

"Notice of Allowance Issued in U.S. Appl. No. 13/560,468", dated Mar. 6, 2014, 8 Pages.

"Final Office Action Issued in U.S. Appl. No. 13/653,318", dated Dec. 4, 2014, 24 Pages.

"Final Office Action Issued in U.S. Appl. No. 13/653,318", dated Jun. 5, 2015, 23 Pages.

"Non-Final Office Action Issued in U.S. Appl. No. 13/653,318", dated Feb. 20, 2015, 20 Pages.

"Non-Final Office Action Issued in U.S. Appl. No. 13/653,318", dated Jul. 29, 2014, 24 Pages.

"Notice of Allowance Issued in U.S. Appl. No. 13/653,318", dated Sep. 4, 2015, 11 Pages.

Balman, et al., "Early Error Detection and Classification in Data Transfer Scheduling", In Proceedings of the International Conference on Complex, Intelligent and Software Intensive Systems, Mar. 16, 2009, pp. 457-462.

Barga, et al., "Measuring and Optimizing a System for Persistent Database Sessions", In Proceedings of the 17th International Conference on Data Engineering, Apr. 2001, pp. 21-30.

Barga, et al., "Persistent Client-Server Database Sessions", In Proceedings of the 7th International Conference on Extending Database Technology: Advances in Database Technology, Mar. 27, 2000, pp. 462-477.

Lomet, et al., "Efficient Transparent Application Recovery in Client-Server Information Systems", In Proceedings of the ACM SIGMOD International Conference on Management of Data, Jun. 1998, pp. 460-471.

"International Search Report and Written Opinion Issued in PCT Application No. PCT/US2013/051751", dated Oct. 8, 2013, 11 Pages.

"International Search Report and Written Opinion Issued in PCT Application No. PCT/US2013/052152", dated Oct. 9, 2013, 9 Pages.

"International Search Report & Written Opinion Issued in PCT Application No. PCT/US2013/065155", dated Jun. 26, 2014, 10 Pages.

"First Office Action and Search Report Issued in Chinese Patent Application No. 201380054161.2", dated Dec. 5, 2016, 13 Pages.

(56) References Cited

OTHER PUBLICATIONS

"Third Office Action Issued in Chinese Patent Application No. 201380054161.2", dated Jan. 5, 2018, 6 Pages.

SMART ERROR RECOVERY FOR DATABASE APPLICATIONS

CROSS-REFERENCE TO RELATED APPLICATIONS

This application is a continuation of U.S. patent application Ser. No. 13/653,318, filed Oct. 16, 2012, now U.S. Pat. No. 9,235,464, the entirety of which is incorporated by reference herein.

BACKGROUND

A database server is a software product that provides database services to software applications (sometimes referred to as "database applications") in response to requests received therefrom. Such database services may include but are not limited to storing, retrieving, analyzing or manipulating database data. Depending upon the implementation, the database applications may be running on the same machine on which the database server is running or may be running on other machines that are connected to the machine on which the database server is running via one or more networks. To send requests to the database server, a database application opens a connection to the database server and establishes therewith what is referred to as a session. A session represents an ongoing interactive information exchange between the database application and the database server. Typically, a session is set up or established at a certain point in time and then torn down at a later point in time. An established session often involves the sending of more than one message from the database application to the database server and from the database server to the database application.

A database application that has connected to a remote database server in the manner set forth above may experience errors due to failures or other problems occurring at the database server or in the environment of the database server (sometimes referred to as the "back-end"). Such errors may cause the database application and even the database server to simply stop working. To address this issue, logic may be included in the database application that is configured to receive error messages from the database server and to perform operations in response to receiving those error messages. However, including such logic in the database application makes it more difficult to develop such application and causes such application to be more complex. Furthermore, it is possible that the database application cannot be programmed to anticipate all possible error codes or messages generated by the database server.

Furthermore, when a database application experiences errors due to a back-end problem or due to a problem with the application itself, information technology (IT) professionals, database administrators (DBAs) and developers are mobilized to understand the nature of the problem. However, troubleshooting production environments can be challenging, due to time constraints, lack of tools and other limitations. For example, troubleshooting a large number of instances of a database application can be challenging in a large-scale deployment when local interaction with each database application is required to perform such troubleshooting.

SUMMARY

Systems and methods are described herein that facilitate the performance of smart error recovery operations for database applications. As will be discussed herein, smart error recovery is achieved by a database driver that is configured to perform database operations on behalf of a database application, wherein both the database application and database driver are installed on a client. The database driver is further configured to perform operations to intelligently recover from a database server failure. Such intelligent recovery may involve, for example, restoring the database application and/or database server to a good state after a database server failure. The smart error recovery operations performed by the database driver may be performed based on intelligence located within the database driver itself as well as additional information passed from the database server to the database driver.

In accordance with certain embodiments described herein, a database server includes logic that is operable to monitor and analyze at least events occurring within an environment of the database server and/or execution errors generated by the database server in order to detect whether a problem condition exists. The database server further includes logic that is operable to send one or more commands to a database driver of a client that is communicatively connected to the database server, the one or more commands specifying one or more actions to be taken by the database driver in response to the existence of the problem condition.

In one embodiment, the database server is operable to send the one or more commands to the database driver within a context of a session established between the database server and the client as part of an application layer request/response protocol, such as a Tabular Data Stream (MS-TDS) protocol. In further accordance with such an embodiment, the database server may be operable to add the one or more commands to a response that is to be transmitted from the database server to the database driver. In an alternate embodiment, a gateway device that is communicatively connected between the database server and the client may also be operable to send the one or more commands to the database driver.

In a further embodiment, the problem condition that is detected is a failover from the database server to an alternate database server. In further accordance with such an embodiment, the one or more commands that are sent to the database driver may include at least one command that indicates a time period during which the database driver should not try to reconnect to the database server. In a still further embodiment, the one or more commands that are sent to the database driver include at least one command that is configured to cause the database driver to collect information, such as one or more performance-related or usage-related parameters.

In further accordance with certain embodiments described herein, a client that is communicatively connected to a database server includes a database driver that is operable to receive one or more commands from the database server, the one or more commands specifying one or more actions to be taken by the database driver in response to a problem condition identified by the database server. The database driver further includes logic that is operable to cause the one or more commands to be executed.

In one embodiment, the database driver is operable to receive the one or more commands within a context of a session established between the database server and the client as part of an application layer request/response protocol, such as an MS-TDS protocol. In further accordance with such an embodiment, the database driver may be operable to extract the one or more commands from a response received from the database server within the context of the session.

In a further embodiment, the client database driver operable to execute the one or more commands by preventing attempts to reconnect to the database server from occurring during a predetermined time period. In another embodiment, the database driver is operable to execute the one or more commands by causing information, such as one or more performance-related or usage-related parameters, to be tracked. In further accordance with such an embodiment, the database driver may also be operable to cause the collected information to be sent to a remote entity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 1:
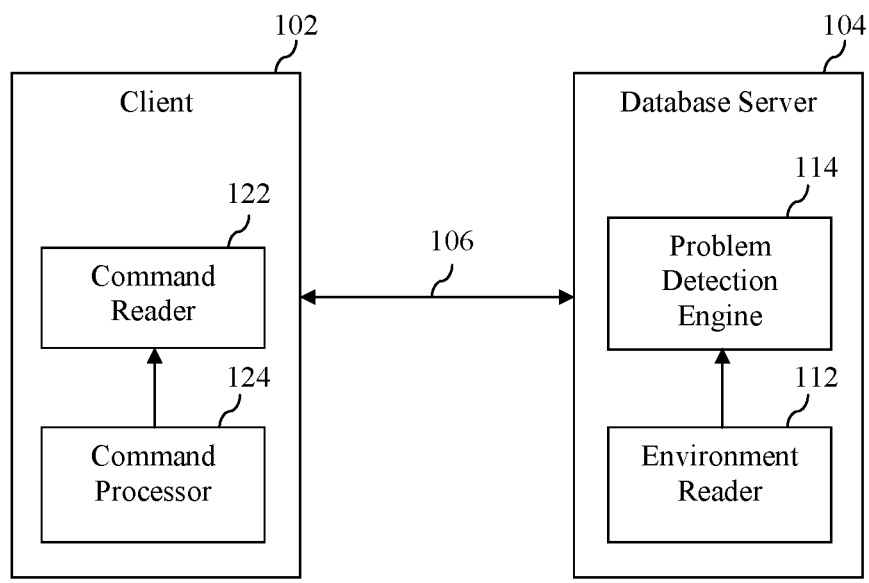
FIG. 1 is a block diagram of an example system that provides smart error recovery capabilities to a client that executes a database application in accordance with one embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

Generally speaking, embodiments described herein may be used to cause a client executing a database application to perform certain desired actions or avoid certain undesired actions in response to the detection of trouble conditions occurring at or in the environment of a database server to which the client is communicatively connected. For example, in accordance with certain embodiments described herein, the client may be prohibited from attempting to reconnect to the database server for a predetermined time period if it is determined that the database server is failing over to an alternate database server. As another example, in accordance with certain embodiments described herein, the client may be instructed to start collecting certain performance-related data, usage-related data, or other information that may be helpful in troubleshooting a problem condition. Such collected information may subsequently be uploaded or otherwise transmitted from the client to the database server or some other entity to be analyzed alone in or in conjunction with other information collected from other clients.

As will be described herein, to detect whether a problem condition exists, a database server in accordance with an embodiment includes logic that is operable to monitor and analyze events occurring within an environment of the database server and/or execution errors generated by the database server. In further accordance with such an embodiment, the database server further includes logic that is operable to send one or more commands to a database driver of the client in response to the detection of a problem condition, the one or more commands specifying one or more actions to be taken by the database driver in response to the existence of the problem condition. As also will be described herein, a database driver in accordance with an embodiment includes logic that is operable to receive the one or more commands from the database server and logic that is operable to cause the one or more commands to be executed.

In one embodiment, the database server is operable to send the one or more commands to the database driver within a context of a session established between the database server and the client as part of an application layer request/response protocol, such as a Tabular Data Stream (MS-TDS) protocol. In further accordance with such an embodiment, the database server may be operable to add the one or more commands to a response that is to be transmitted from the database server to the database driver. In this manner, an existing request/response protocol can be leveraged to carry the one or more commands. In an alternate embodiment, a gateway device that is communicatively connected between the database server and the client may also be operable to send the one or more commands to the database driver.

The components described above can advantageously be utilized to perform smart error recovery operations for database applications. For example, in accordance with the foregoing description, the database driver can be configured to perform operations to intelligently recover from a database server failure. Such intelligent recovery may involve, for example, restoring a database application and/or a database server to a good state after a database server failure. The smart error recovery operations performed by the database driver may be performed based on intelligence located within the database driver itself as well as additional information passed from the database server to the database driver. In accordance with certain implementations, the one or more commands transmitted from the database server to the database driver may include code, such as methods, algorithms or dynamic scripts, which can be executed by or on behalf of the database driver. Alternatively or additionally, processing of the one or more commands by the database driver may cause certain code resident in the database driver to be activated.

By enabling various operations to be performed by the database driver in response to commands received from the database server, certain embodiments described herein enable users of database applications to reap the benefits of fine-grained database server control over the database application without having to implement additional logic in the application layer.

Although the embodiments described herein are implemented in systems that include database servers and clients, persons skilled in the relevant art(s) will readily appreciate that the concepts described herein can easily be extended to any system in which a session or other ongoing interactive information exchange is established between a first entity and a second entity. Such systems may include but are not limited to any of a wide variety of client-server systems, peer-to-peer systems, or the like.

II. Example System and Methods for Providing Smart Error Recovery Capabilities to a Database Application FIG. 1 is a block diagram of an example system 100 that provides smart error recovery capabilities to a client that executes a database application in accordance with one embodiment. System 100 is described herein by way of illustration only and is not intended to be limiting. Persons skilled in the relevant art(s) will appreciate that embodiments described herein may be implemented in systems other than system 100.

As shown in FIG. 1, system 100 includes a database server 104 and a client 102 that is communicatively connected thereto via a communication channel 106. Database server 104 is intended to represent an entity that performs operations with respect to data stored in one or more databases that are accessible thereto in response to receiving commands generated by clients, such as client 102, via communication channel 106. The operations performed by database server 104 may include, for example, storing, retrieving, analyzing and/or manipulating database data. Database server 104 may be implemented as software executing on a single machine or across multiple machines. As will be appreciated by persons skilled in the relevant art(s), such machines may comprise physical machines or virtual machines. In one embodiment, database server 104 comprises an instance of MICROSOFT SQL SERVER®, published by Microsoft Corporation of Redmond Wash. However, this is an example only and is not intended to be limiting.

In one embodiment, database server 104 comprises a standalone database server configured to execute commands received from one or more clients, such as client 102. In an alternate embodiment, database server 104 comprises one of a plurality of database server instances running on a cluster of machines and employed to service requests from a plurality of clients, such as client 102, in a manner that allows for failover and high availability. In a further embodiment, database server 104 comprises one of a plurality of database server instances used to implement a cloud database service, such as but not limited to MICROSOFT SQL AZURE™ offered by Microsoft Corporation of Redmond, Wash.

Client 102 is intended to represent an entity that generates and sends commands to database server 104 for execution thereby. Such commands may include, for example, commands to store, retrieve, analyze and/or manipulate database data. Like database server 104, client 102 may be implemented as software executing on one or more machines.

Client 102 and database server 104 may each be executed by different machines that are connected to each other via a particular communication infrastructure. In further accordance with such an implementation, communication channel 106 may be established in a manner that corresponds to the particular communication infrastructure. For example, in an embodiment in which the communication infrastructure comprises a network, such as a local area network (LAN) or wide area network (WAN), well-known networking protocols may be used to establish communication channel 106 between the two machines. As another example, in an embodiment in which database server 104 comprises part of a cloud database service, communication channel 106 may be established via a gateway machine that acts as an intermediary between the machine on which client 102 is running and the machine on which database server 104 is running. Still other communication infrastructures and associated methods for establishing communication channel 106 are possible.

It is also possible that client 102 and database server 104 may be executing on the same machine. In accordance with such an implementation, communication channel 106 may comprise one or more interfaces that are internal to the machine upon which both entities are executing.

Generally speaking, communication channel 106 is used to transport commands generated by client 102 to database server 104 so that database server 104 may execute such commands. Database server 104 may also return requested data, error messages, or other information to client 102 via communication channel 106. In accordance with certain embodiments, the manner in which information is exchanged between client 102 and database server 104 is governed by a standard application layer request/response protocol that is supported by both entities. For example, in a particular embodiment, the application layer protocol comprises the Tabular Data Stream (MS-TDS) protocol, as defined in Version 20120328 of the Tabular Data Stream Protocol Specification, published by Microsoft Corporation of Redmond, Wash. However, this is only an example, and other protocols may be used.

In one embodiment, to interact with database server 104 for the purpose of invoking the database services thereof, client 102 connects to database server 104 and establishes a session therewith. In further accordance with such an embodiment, database server 104 authenticates client 102 and/or a user thereof as part of establishing the session.

As shown in FIG. 1, database server 104 includes an environment reader 112 and a problem detection engine 114. Environment reader 112 comprises logic that is operable to identify and monitor events occurring in an environment of database server 104 and to pass information about such events to problem detection engine 114. Monitoring events occurring in the environment of database server 104 may comprise, for example, monitoring information generated by or otherwise related to one or more processes, devices, systems, or interfaces used to implement database server 104 or to which database server 104 may be connected, either directly or indirectly. Such monitoring may comprise, for example, monitoring changes in the resource utilization or operational state of any such process, device, system or interface. However, this example is not intended to be limiting.

Environment reader 112 may be configured to pass only certain types of event information to problem detection engine 114. For example, environment reader 112 may be configured to only pass information to problem detection engine 114 about events that could impact the performance of database server 104. For example, in one embodiment, environmental reader 112 is configured to only pass information to problem detection engine 114 about events that could cause database server 104 to fail or that would tend to indicate that database server 104 will fail (including, for example, a fail over to an alternate database server). However, this is only and example and information about other types of events may also be selectively passed from environment reader 112 to problem detection engine 114.

Problem detection engine 114 comprises logic that is operable to process the event information received from environment reader 112 to determine whether or not a problem condition exists that would necessitate communication with client 102. Problem detection engine 114 may also include logic that is operable to analyze execution errors generated by database server 104 to determine if such a problem condition exists. Problem detection engine 114 further includes logic that sends one or more commands to client 102 via communication channel 106 in response to determining that such a problem condition exists. The one or more commands may specify one or more actions to be taken by client 102 in response to the problem condition.

In one embodiment, problem detection engine 114 is configured to send the one or more commands to client 102 within a context of a session established between database server 104 and client 102 as part of an application layer request/response protocol, such as but not limited to the aforementioned MS-TDS protocol. In further accordance with such an embodiment, problem detection engine 114 may be configured to add the one or more commands to a response that is to be transmitted from database server 104 to client 102. By "piggy-backing" the one or commands onto the response in this manner, the request/response protocol can be leveraged to carry the one or more commands.

In an alternate embodiment, problem detection engine 114 is configured to send the one or more commands to client 102 "out of band" with respect to a session that has been established between database server 104 and client 102. Such out-of-band communication may be carried out, for example, by establishing a separate session between database server 104 and client 102 for the purpose of carrying the one or more commands. Still other communication channels may be established between database server 104 and client 102 for carrying the one or more commands there between.

In accordance with certain embodiments, problem detection engine 114 is further configured to execute actions that are intended to prevent database server 104 from failing in response to detecting the problem condition.

As further shown in FIG. 1, client 102 includes a command reader 122 and a command processor 124. Command reader 122 comprises logic that is operable to receive the one or more commands sent from database server 104 over communication channel 106. In one embodiment, command reader 122 comprises a subset of logic within client 102 that operates to parse packetized data received from database server 104 in accordance with MS-TDS or some other application layer protocol and to extract information therefrom. In the case of command reader 122, the extracted information includes the one or more commands. As noted above, such commands may comprise part of a response that was sent from database server 104 in accordance with the application layer protocol.

Command processor 124 comprises logic that is operable to execute the one or more commands received by smart error reader 122. Execution of the one or more commands may enable client 102 to recover from certain error situations. In one example embodiment, command processor 124 executes the one or more commands by preventing client 102 from attempting to reconnect to database server 104 during a predetermined time period. Such behavior may be appropriate, for example, when database server 104 is failing over to an alternate database server and attempts to reconnect thereto would be futile and consume resources unnecessarily. In certain embodiments, rather than simply receiving and executing a command that prevents reconnection attempts for a predetermined time period, command processor 124 may be configured to automatically select between waiting to reconnect to database server 104 or causing a database application executing on client 102 to fail based upon the duration of the predetermined time period.

In a further example embodiment, command processor 124 executes the one or more commands by causing information to be collected by client 102. Such collected information may include, for example, one or more performance-related or usage-related parameters. The collected information may be helpful in troubleshooting a problem condition. Such collected information may subsequently be uploaded or otherwise transmitted from client 102 to database server 104 or some other entity to be analyzed alone in or in conjunction with other information collected from other clients.

In a still further example embodiment, command processor 124 executes the one or more commands by causing a database application executing on client 102 to simply retry sending a command to database server 104.

In certain embodiments, command processor 124 is configured to perform only a limited number of actions in response to execution of the one or more commands. Limiting the number of actions that can be performed by command processor 124 in this manner can help to reduce the risks associated with arbitrary remote code execution.

More information regarding the structure, function and operation of the components of system 100 in accordance with various implementations will now be provided in regard to FIGS. 2-5.

Figure 2:
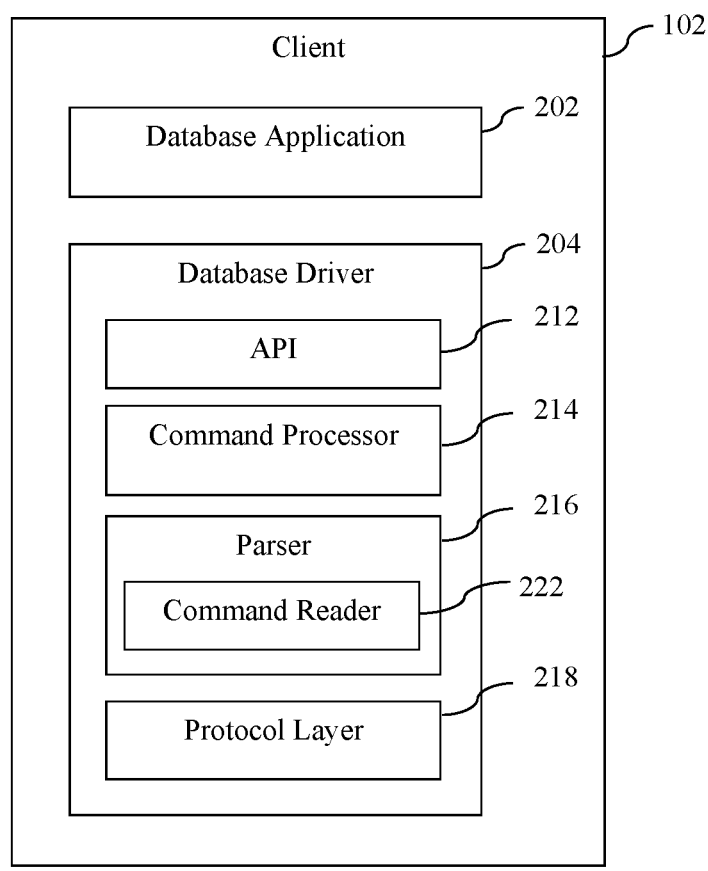
FIG. 2 is a block diagram that illustrates various elements of a client shown in FIG. 1 in accordance with one example embodiment.

In particular, FIG. 2 is a block diagram that illustrates various elements of client 102 in accordance with one example embodiment. As shown in FIG. 2, in the example embodiment, client 102 comprises a database application 202 and a database driver 204. Database application 202 comprises a software program that enables a user thereof to perform various functions, at least some of which require database operations to be performed. In order to facilitate the performance of such database operations, database application 202 is programmed to interact with database driver 204. Database driver 204 comprises a software component that operates to establish a connection between database application 202 or any of a variety of other applications and a database server and to utilize such connection for the purpose of obtaining services from the database server.

In one embodiment, database driver 204 provides an application programming interface (API) 212 that can be used by any of a variety of database applications to invoke the functionality thereof. As further shown in FIG. 2, database driver 204 also includes a command processor 214, a parser 216, and a protocol layer 218. Command processor 214 is intended to represent one implementation of command processor 124 described above in reference to system 100 of FIG. 1 and thus performs the functions attributed herein to that component. Parser 216 is a software component that is configured to encode commands to be sent to a database server and to interpret information received therefrom in accordance with a particular application layer protocol, such as but not limited to MS-TDS. As shown in FIG. 2, parser 216 includes a command reader 222, which is intended to represent one implementation of command reader 122 described above in reference to system 100 of FIG. 1 and thus performs the functions attributed herein to that component. Protocol layer 218 is intended to represent one or more software component(s) utilized by database driver 204 to carry encoded commands produced by parser 216 to a database server and to receive encoded information therefrom.

In accordance with the embodiment shown in FIG. 2, the functions performed by command reader 222 and command processor 214 in relation to receiving and executing commands from a database server are performed at the level of database driver 204 rather than at the level of database application 202. This is advantageous in that it allows database applications that are designed to invoke database driver 204, such as database application 202, to reap the benefits of these functions (e.g., the ability to recover from and/or appropriately react to problem conditions detected by a database server that is connected to client 102), while relieving programmers of such database applications from having to program the database applications to support such functions. Additionally, by incorporating such functionality at the database driver level rather than the database application level, embodiments described herein can advantageously reduce the complexity of such database applications.

Figure 3:
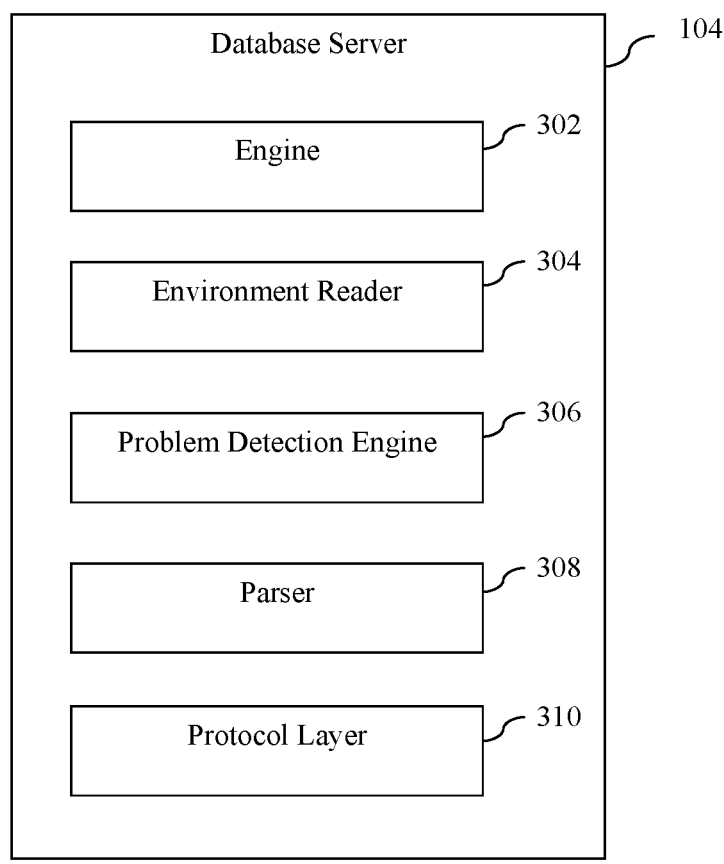
FIG. 3 is a block diagram that illustrates various elements of a database server shown in FIG. 1 in accordance with one example embodiment.

FIG. 3 is a block diagram that illustrates various elements of database server 104 in accordance with a further example embodiment. As shown in FIG. 3, in the further example embodiment, database server 104 comprises an engine 302, an environment reader 304, a problem detection engine 306, a parser 308 and a protocol layer 310. Engine 302 comprises a software component that is configured to interact with one or more databases to perform various operations on data stored therein, where such operations include but are not limited to storing, retrieving, analyzing and/or manipulating database data. Environment reader 304 is intended to represent one implementation of environment reader 112 as described above in reference to system 100 of FIG. 1 and thus performs the functions attributed herein to that component. Problem detection engine 306 is intended to represent one implementation of problem detection engine 114 as described above in reference to system 100 of FIG. 1 and thus performs the functions attributed herein to that component. Parser 308 is a software component that is configured to interpret client-generated commands that are received by database server 104 and to encode information to be sent to clients in accordance with a particular application layer protocol, such as but not limited to MS-TDS. Protocol layer 310 is intended to represent one or more software component(s) utilized by database server 104 to carry encoded information produced by parser 308 to the appropriate clients and to receive encoded commands therefrom.

Figure 4:
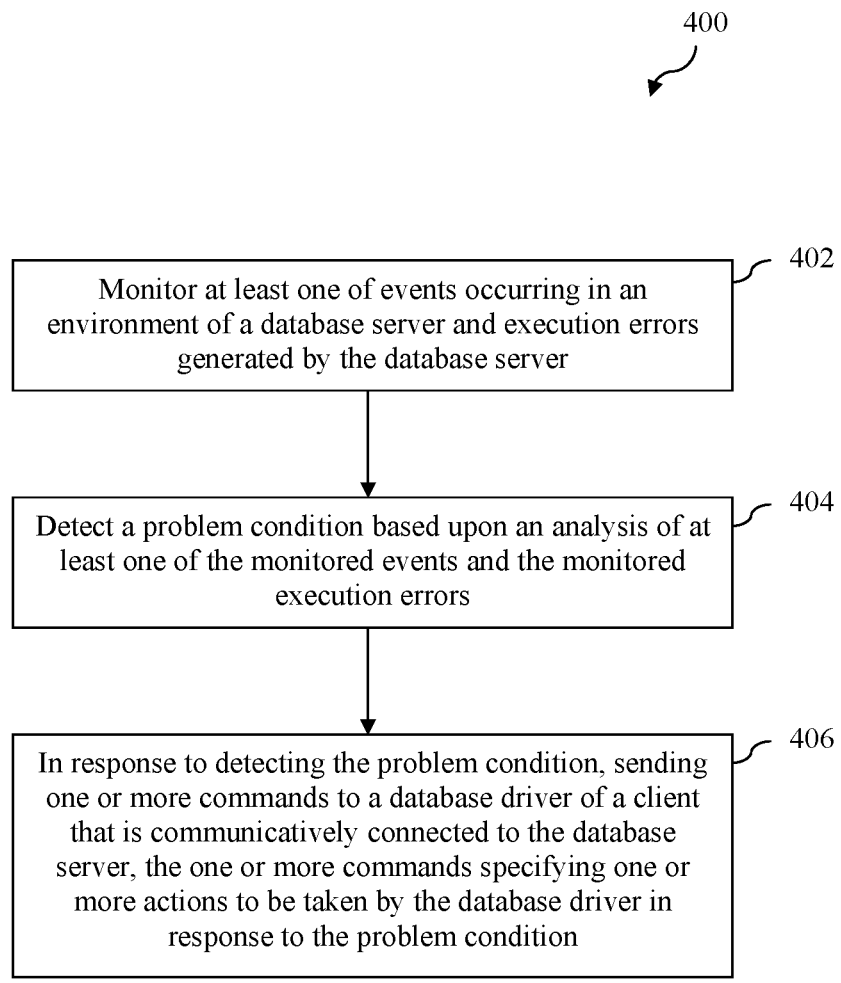
FIG. 4 depicts a flowchart of a first method for providing smart error recovery capabilities to a client that executes a database application in accordance with one embodiment.

FIG. 4 depicts a flowchart 400 of a first method for providing smart error recovery capabilities to a client that executes a database application in accordance with one embodiment. For the sake of illustration, the steps of flowchart 400 will now be described with continued reference to example embodiments described above in reference to FIGS. 1-3. However, the method of flowchart 400 is not limited to those embodiments.

As shown in FIG. 4, the method of flowchart 400 begins at step 402 in which a database server, such as database server 104, monitors at least one of events occurring in an environment of a database server and execution errors generated by the database server. As discussed above, the monitoring of events occurring in an environment of the database server may be performed by environment reader 112 of FIG. 1 or environment reader 304 of FIG. 3. As also discussed above, the monitoring of execution errors generated by the database server may be performed by problem detection engine 114 of FIG. 1 or problem detection engine 306 of FIG. 3.

At step 404, the database server detects a problem condition based upon an analysis of at least one of the monitored events and the monitored execution errors. As discussed above, the detection of the problem condition based upon the analysis of the at least one of the monitored events and the monitored execution errors may be performed by problem detection engine 114 of FIG. 1 or problem detection engine 306 of FIG. 3.

In one embodiment, step 404 comprises detecting that a failover from the database server to an alternate database server is going to occur. However, this is only one example, and persons skilled in the relevant art(s) will appreciate that a wide variety of different problem conditions may be detected.

At step 406, in response to detecting the problem condition, the database server sends one or more commands to a database driver of a client that is communicatively connected to the database server, such as client 102. The one or more commands specify one or more actions to be taken by the database driver in response to the problem condition. As discussed above, the sending of the one or more commands to the database driver may be performed by problem detection engine 114 of FIG. 1 or problem detection engine 306 of FIG. 3.

In one embodiment, step 406 comprises sending the one or more commands to the database driver within a context of a session established between the database server and the client as part of an application layer request/response protocol, such as but not limited to the aforementioned MS-TDS protocol. In accordance with such an embodiment, step 406 may further comprise generating a response to a request received from the database driver, adding the one or more commands to the response, and transmitting the modified response to the database driver. As noted above, by "piggybacking" the one or commands onto the response in this manner, the request/response protocol can be leveraged to carry the one or more commands.

In a further embodiment, step 406 comprises sending at least one command to the database driver that indicates a time period during which the database driver should not try to reconnect to the database server. As discussed above, by preventing the database driver from trying to reconnect during certain time periods (e.g., when a failover is occurring from the database server to an alternate database server), the unnecessary consumption of resources associated with failed reconnect attempts can be mitigated or avoided entirely.

In a still further embodiment, step 406 may comprise sending at least one command to the database driver that is configured to cause the database driver to collect information, such as one or more parameters relating to the performance or usage of the client, the performance or usage of a database application executing on the client, the performance or usage of a query being executed by the database application, or the like. As discussed above, the information that is collected may be helpful in troubleshooting the problem condition detected by the database server or some other problem condition. Such collected information may subsequently be uploaded or otherwise transmitted from the client to the database server or some other entity to be analyzed alone in or in conjunction with other information collected from other clients.

The one or more commands that are sent to the database driver may also cause the database driver to perform other useful operations or may be used to provide the database driver with useful information. For example, the one or more commands may instruct the database driver concerning how to react to certain classes of errors, may cause the database driver to switch a connection from one database server to an alternate database server in a manner that is transparent to a client database application, to gather performance or usage data from the client perspective and transmit such data to a database server or other remote entity, to gather error data from the client perspective and transmit such data to a database server or other remote entity, to control a rate at which database operations are transmitted to a database server, to update the database driver to a new version, to flush client-side caches of server information and force them to be refreshed, to cause the client to refresh a cached view (or even portions of a cached view) of some database server data, to transmit a new set of mappings to the client for fan-out or partitioned query support, to update or manage the client connection strings or logical mappings between a logic name and a data source. These are merely a few examples of how such commands may be used. Such examples are not intended to be limiting.

In accordance with certain implementations, the one or more commands transmitted from the database server to the database driver may include code, such as methods, algorithms or dynamic scripts, which can be executed by or on behalf of the database driver. Alternatively or additionally, processing of the one or more commands by the database driver may cause certain code resident in the database driver to be activated.

In accordance with the method of flowchart 400, the one or more commands that are sent to the database driver are sent automatically in response to the detection of a problem condition. In accordance with a further embodiment, the database server or a device or system communicatively connected thereto provides an interface by which an information technology (IT) professional, database administrator (DBA), or other authorized person can also cause such commands to be sent to the database driver via the database server. For example, in one implementation, an IT professional, DBA or other authorized person can interact with the interface to cause one or more commands to be sent to the database driver that will cause the database driver to begin collecting information that is useful for troubleshooting a problem condition. Such an interface advantageously enables the IT professional, DBA or other authorized person to leverage an existing connection between the database server and the client to perform telemetry tasks useful for troubleshooting problem conditions. Such an interface also advantageously enables such troubleshooting to be initiated remotely and from a central location as opposed to requiring direct and local interaction with each and every client that is involved in performing the troubleshooting analysis. The interface can further be used to remotely instruct clients to turn off tracking.

Although the steps of flowchart 400 are described above as being performed by a database server, it is to be understood that in alternate implementations other devices and systems may perform these steps. For example, in one embodiment, a device or system that is connected to the database server may perform step 402, while the database server performs steps 404 and 406. In another embodiment, a device or system that is connected to the database server may perform steps 402 and 404, while the database server performs step 406.

As another example, in one embodiment, a gateway device that is communicatively connected between a database server and a client may operate to perform any one or all of the steps of flowchart 400. Such an implementation may be used for example, where the database server is one of a plurality of database server instances used to implement a cloud database service, such as but not limited to MICROSOFT SQL AZURE™, offered by Microsoft Corporation of Redmond, Wash., and wherein such database server instances are accessed by clients via one or more gateway devices.

Figure 5:
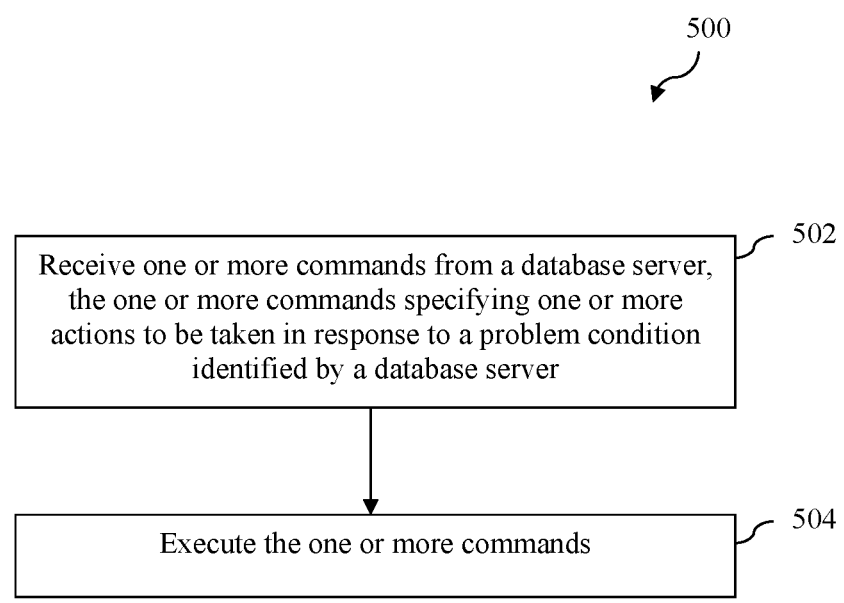
FIG. 5 depicts a flowchart of a second method for providing smart error recovery capabilities to a client that executes a database application in accordance with one embodiment.

FIG. 5 depicts a flowchart 500 of a second method for providing smart error recovery capabilities to a client that executes a database application in accordance with one embodiment. For the sake of illustration, the steps of flowchart 500 will also be described with continued reference to example embodiments described above in reference to FIGS. 1-3. However, the method of flowchart 500 is not limited to those embodiments.

As shown in FIG. 5, the method of flowchart 500 begins at step 502, in which a client, such as client 102, receives one or more commands from a database server. The one or more commands specify one or more actions to be taken by the client in response to a problem condition identified by a database server, such as database server 104. As discussed above, the receiving of the one or more commands may be performed by command reader 122 of FIG. 1 or command reader 222 of FIG. 2.

In one embodiment, step 502 comprises receiving the one or more commands within a context of a session established between the database server and the client as part of an application layer request/response protocol, such as but not limited to the aforementioned MS-TDS protocol. In further accordance with such an embodiment, step 502 may comprise extracting the one or more commands from a response received from the database server within the context of the session.

At step 504, the client executes the one or more commands that were received during step 502. As discussed above, the executing of the one or more commands may be performed by command processor 124 of FIG. 1 or command processor 214 of FIG. 2.

In one embodiment, step 504 comprises preventing attempts to reconnect to the database server from occurring during a predetermined time period. As discussed above, by preventing the client from trying to reconnect during certain time periods (e.g., when a failover is occurring from the database server to an alternate database server), the unnecessary consumption of resources associated with failed reconnect attempts can be mitigated or avoided entirely.

In a further embodiment, step 504 comprises causing information to be collected by the client. The information that may be collected may include parameters relating to the performance or usage of the client, the performance or usage of a database application executing on the client, the performance or usage of a query being executed by the database application, or the like. As discussed above, the information that is collected may be helpful in troubleshooting the problem condition detected by the database server or some other problem condition. In further accordance with such an embodiment, step 504 may further comprise subsequently uploading or otherwise transmitting the collected information from the client to the database server or some other remote entity to be analyzed alone in or in conjunction with other data collected from other clients.

In certain other embodiments, step 504 may comprise performing other useful operations or receiving useful information. For example, step 504 may comprise receiving information concerning how to react to certain classes of errors, switching a connection from one database server to an alternate database server in a manner that is transparent to a client database application, gathering performance or usage data from the client perspective and transmitting such data to a database server or other remote entity, gathering error data from the client perspective and transmitting such data to a database server or other remote entity, controlling a rate at which database operations are transmitted to a database server, updating a database driver to a new version, flushing client-side caches of server information and forcing them to be refreshed, causing the client to refresh a cached view (or even portions of a cached view) of some database server data, providing a new set of mappings to the client for fan-out or partitioned query support, updating or managing client connection strings or logical mappings between a logic name and a data source. However, these are merely a few non-limiting examples.

In accordance with certain implementations, step 504 may comprise executing code received from the database server during step 502, such as methods, algorithms or dynamic scripts. Alternatively or additionally, step 504 may comprise causing certain code resident in the client, such as in a database driver of the client, to be activated.

III. Example Processor-Based System Implementation

Figure 6:
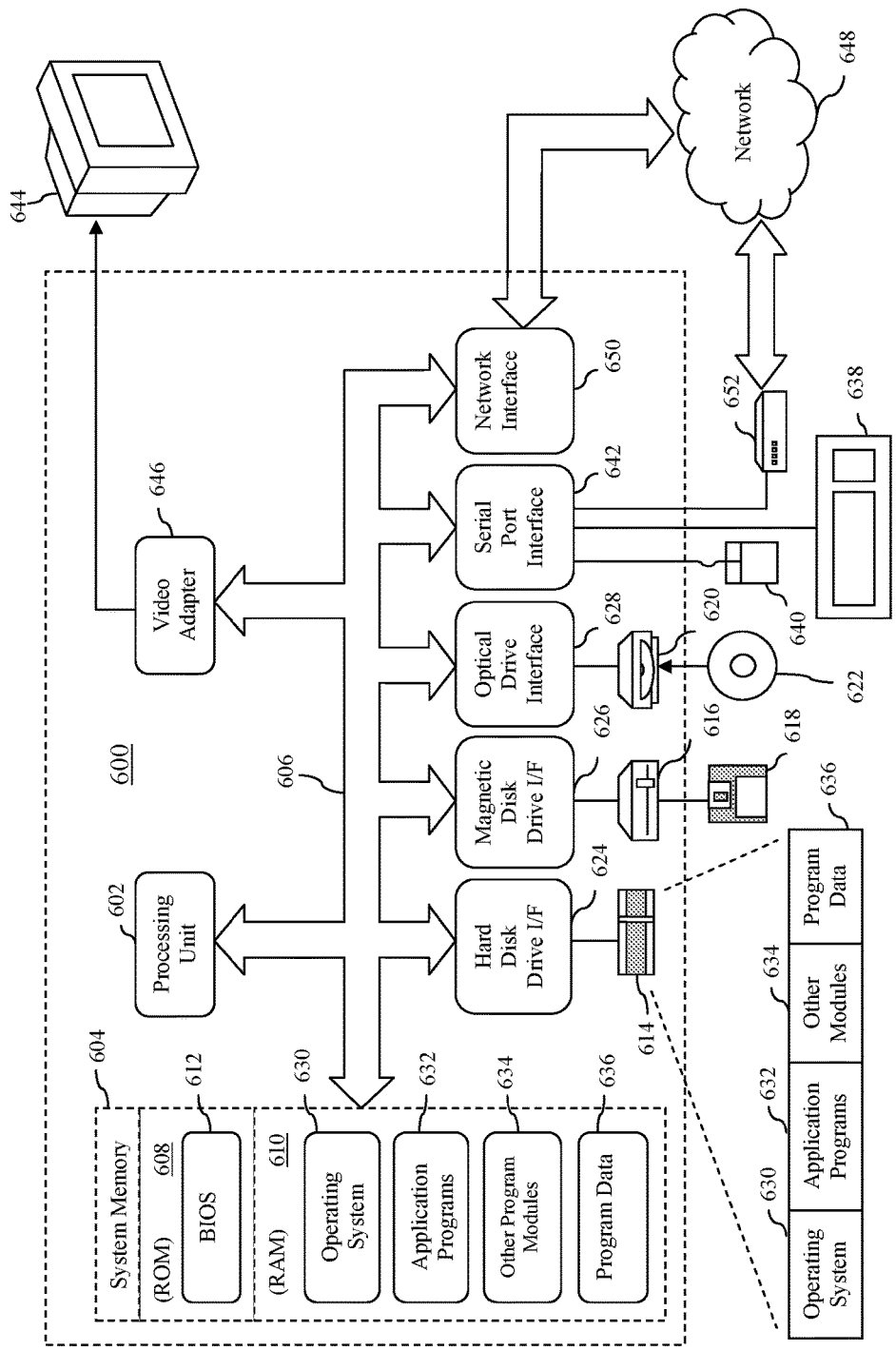
FIG. 6 is a block diagram of an example processor-based system that may be used to implement various embodiments.

FIG. 6 depicts an example processor-based computer system 600 that may be used to implement various embodiments described herein. For example, system 600 may be used to implement client 102 and/or database server 104 as described above in reference to FIGS. 1-3 as well as various sub-components thereof. The description of system 600 provided herein is provided for purposes of illustration, and is not intended to be limiting. Embodiments may be implemented in further types of computer systems, as would be known to persons skilled in the relevant art(s).

As shown in FIG. 6, system 600 includes a processing unit 602, a system memory 604, and a bus 606 that couples various system components including system memory 604 to processing unit 602. Processing unit 602 may comprise one or more processors or processing cores. Bus 606 represents one or more of any of several types of bus structures, including a memory bus or memory controller, a peripheral bus, an accelerated graphics port, and a processor or local bus using any of a variety of bus architectures. System memory 604 includes read only memory (ROM) 608 and random access memory (RAM) 610. A basic input/output system 612 (BIOS) is stored in ROM 608.

System 600 also has one or more of the following drives: a hard disk drive 614 for reading from and writing to a hard disk, a magnetic disk drive 616 for reading from or writing to a removable magnetic disk 618, and an optical disk drive 620 for reading from or writing to a removable optical disk 622 such as a CD ROM, DVD ROM, BLU-RAY™ disk or other optical media. Hard disk drive 614, magnetic disk drive 616, and optical disk drive 620 are connected to bus 606 by a hard disk drive interface 624, a magnetic disk drive interface 626, and an optical drive interface 628, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These program modules include an operating system 630, one or more application programs 632, other program modules 634, and program data 636. In accordance with various embodiments, the program modules may include computer program logic that is executable by processing unit 602 to perform any or all of the functions and features of client 102 or database server 104 as described above in reference to FIGS. 1-3, as well as various sub-components thereof, as described elsewhere herein. The program modules may also include computer program logic that, when executed by processing unit 602, performs any of the steps or operations shown or described in reference to the flowcharts of FIGS. 4 and 5.

A user may enter commands and information into system 600 through input devices such as a keyboard 638 and a pointing device 640. Other input devices (not shown) may include a microphone, joystick, game controller, scanner, or the like. In one embodiment, a touch screen is provided in conjunction with a display 644 to allow a user to provide user input via the application of a touch (as by a finger or stylus for example) to one or more points on the touch screen. These and other input devices are often connected to processing unit 602 through a serial port interface 642 that is coupled to bus 606, but may be connected by other interfaces, such as a parallel port, game port, or a universal serial bus (USB).

A display 644 is also connected to bus 606 via an interface, such as a video adapter 646. In addition to display 644, system 600 may include other peripheral output devices (not shown) such as speakers and printers.

System 600 is connected to a network 648 (e.g., a local area network or wide area network such as the Internet) through a network interface or adapter 650, a modem 652, or other suitable means for establishing communications over the network. Modem 652, which may be internal or external, is connected to bus 606 via serial port interface 642.

As used herein, the terms "computer program medium" and "computer-readable medium" are used to generally refer to non-transitory media such as ROM 608 and RAM 610 used to implement system memory 604, the hard disk associated with hard disk drive 614, removable magnetic disk 618, removable optical disk 622, as well as other media such as flash memory cards, digital video disks, and the like.

As noted above, computer programs and modules (including application programs 632 and other program modules 634) may be stored on ROM 608, RAM 610, the hard disk associated with hard disk drive 614, the removable magnetic disk 618, or the removable optical disk 622. Such computer programs may also be received via network interface 650 or serial port interface 642. Such computer programs, when executed by processing unit 602, enable system 600 to implement features of embodiments discussed herein. Accordingly, such computer programs represent controllers of system 600.

Embodiments are also directed to computer program products comprising software stored on any computer-readable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as ROM, RAM, hard drives, floppy disks, CD ROMs, DVD ROMs, zip disks, tapes, magnetic storage devices, optical storage devices, MEMS-based storage devices, nanotechnology-based storage devices, and the like.

In alternative implementations, each of client 102 and database server 104 as described above in reference to FIGS. 1-3, as well as various sub-components thereof, may be implemented as hardware logic/electrical circuitry or firmware. In accordance with further embodiments, one or more of these components may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

VI. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system, comprising:
at least one processor;
a memory connected to the at least one processor that stores instructions that, when executed by the at least one processor, cause the at least one processor to:
monitor at least one of events occurring in an environment of a database server implemented on a first computer or execution errors generated by the database server;
detect a problem condition based upon an analysis of at least one of the monitored events or the monitored execution errors; and
in response to detecting the problem condition, send one or more commands to a database driver of a client implemented on a second computer that is communicatively connected to the first computer via a network, the one or more commands comprising executable code that when executed by the database driver, causes the database driver to perform one or more actions that at least assist the client in recovering from the problem condition.

2. The system of claim 1, wherein the executable code comprises one or more methods, algorithms or dynamic scripts.

3. The system of claim 1, wherein the instructions, when executed by the at least one processor, cause the at least one processor to send the one or more commands to the database driver within a context of a session established between the database server and the client as part of an application layer request/response protocol.

4. The system of claim 3, wherein the instructions, when executed by the at least one processor, cause the at least one processor to send the one or more commands to the database driver within a context of a session established between the database server and the client as part of a Tabular Data Stream protocol.

5. The system of claim 1, wherein the instructions, when executed by the at least one processor, cause the at least one processor to send the one or more commands to the database driver by:
adding the one or more commands to a response generated by the database server in response to a request received from the database driver; and
transmitting the one or more commands and the response to the database driver.

6. The system of claim 1, wherein the instructions, when executed by the at least one processor, cause the at least one processor to detect the problem condition by detecting that a failover from the database server to an alternate database server is going to occur.

7. The system of claim 1, wherein at least one of the one or more commands indicates:
a time period during which the database driver is not to try to reconnect to the database server;
how to react to certain classes of errors;
that a connection should be switched from the database server to an alternate database server;
a rate at which database operations are to be transmitted to the database server;
that the database driver is to be updated to a new version;
that a client-side cache of server information is to be flushed;
that a cached view of database server data or a portion thereof is to be refreshed;
a new set of mappings for fan-out or partitioned query support; or that client connection strings or logical mappings between a logic name and a data source are to be managed or updated.

8. The system of claim 1, wherein at least one of the one or more commands is configured to cause the database driver to collect troubleshooting information.

9. A system, comprising:
at least one processor; and
a memory connected to the at least one processor that stores instructions that, when executed by the at least one processor, cause the at least one processor to:
monitor changes in a resource utilization or an operational state of at least one process, device, system, or interface that is used to implement a database server executing on a first computer;
detect a problem condition based upon at least one monitored change in the resource utilization or the operational state of the at least one process, device, system, or interface that is used to implement the database server; and
in response to detecting the problem condition, send one or more commands to a database driver of a client executing on a second computer that is communicatively connected to the first computer via a network, the one or more commands comprising executable code that when executed by the database driver, causes the database driver to perform one or more actions that at least assist the client in recovering from the problem condition.

10. The system of claim 9, wherein the executable code comprises one or more methods, algorithms or dynamic scripts.

11. The system of claim 9, wherein the instructions, when executed by the at least one processor, cause the at least one processor to send the one or more commands to the database driver within a context of a session established between the database server and the client as part of an application layer request/response protocol.

12. The system of claim 9, wherein the instructions, when executed by the at least one processor, cause the at least one processor to send the one or more commands to the database driver within a context of a session established between the database server and the client as part of a Tabular Data Stream protocol.

13. The system of claim 9, wherein the instructions, when executed by the at least one processor, cause the at least one processor to send the one or more commands to the database driver by:
adding the one or more commands to a response generated by the database server in response to a request received from the database driver; and
transmitting the one or more commands and the response to the database driver.

14. The system of claim 9, wherein at least one of the one or more commands indicates:
a time period during which the database driver is not to try to reconnect to the database server;
how to react to certain classes of errors;
that a connection should be switched from the database server to an alternate database server;
a rate at which database operations are to be transmitted to the database server;
that the database driver is to be updated to a new version;
that a client-side cache of server information is to be flushed;
that a cached view of database server data or a portion thereof is to be refreshed;
a new set of mappings for fan-out or partitioned query support; or
that client connection strings or logical mappings between a logic name and a data source are to be managed or updated.

15. The system of claim 9, wherein at least one of the one or more commands is configured to cause the database driver to collect troubleshooting information.

16. A system, comprising:
at least one processor; and
a memory connected to the at least one processor that stores instructions that, when executed by the at least one processor, cause the at least one processor to:
monitor at least one of events occurring in an environment of a database server implemented on a first computer or execution errors generated by the database server;
detect a problem condition based upon an analysis of at least one of the monitored events or the monitored execution errors; and
in response to detecting the problem condition, add one or more commands to a response generated by the database server and transmit the one or more commands and the response to a database driver of a client implemented on a second computer that is communicatively connected to the first computer via a network, the one or more commands comprising executable code that when executed by the database driver, causes the database driver to perform one or more actions that at least assist the client in recovering from the problem condition.

17. The system of claim 16, wherein the executable code comprises one or more methods, algorithms or dynamic scripts.

18. The system of claim 16, wherein the instructions, when executed by the at least one processor, cause the at least one processor to detect the problem condition by detecting that a failover from the database server to an alternate database server is going to occur.

19. The system of claim 16, wherein at least one of the one or more commands indicates:
a time period during which the database driver is not to try to reconnect to the database server;
how to react to certain classes of errors;
that a connection should be switched from the database server to an alternate database server;
a rate at which database operations are to be transmitted to the database server;
that the database driver is to be updated to a new version;
that a client-side cache of server information is to be flushed;
that a cached view of database server data or a portion thereof is to be refreshed;
a new set of mappings for fan-out or partitioned query support; or
that client connection strings or logical mappings between a logic name and a data source are to be managed or updated.

20. The system of claim 16, wherein at least one of the one or more commands is configured to cause the database driver to collect troubleshooting information.

* * * * *